US012122411B2

United States Patent
Aunkst et al.

(10) Patent No.: US 12,122,411 B2
(45) Date of Patent: *Oct. 22, 2024

(54) HAPTIC FUNCTION OF ELECTRIC VEHICLE POWERTRAIN

(71) Applicant: LiveWire EV, LLC, Milwaukee, WI (US)

(72) Inventors: David Isaac Aunkst, St. Francis, WI (US); Eric James Klumpp, Grafton, WI (US); Tim Monahan, Brookfield, WI (US); Sean M. Stanley, Hartford, WI (US)

(73) Assignee: LiveWire EV, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,598

(22) Filed: Apr. 4, 2023

(65) Prior Publication Data

US 2023/0234605 A1  Jul. 27, 2023

Related U.S. Application Data

(63) Continuation of application No. 17/155,373, filed on Jan. 22, 2021, now Pat. No. 11,639,182, which is a
(Continued)

(51) Int. Cl.
*H04B 3/36* (2006.01)
*B60W 50/16* (2020.01)
*F16H 61/24* (2006.01)

(52) U.S. Cl.
CPC ......... *B60W 50/16* (2013.01); *B60W 2300/36* (2013.01); *F16H 61/24* (2013.01)

(58) Field of Classification Search
CPC ............ B60W 50/16; B60W 2300/36; B60W 50/085; B60W 2520/10; B60W 2710/083;
(Continued)

(56) References Cited

U.S. PATENT DOCUMENTS 4,090,592 A  5/1978  Jovick et al.
5,635,903 A  6/1997  Koike et al.
(Continued)

FOREIGN PATENT DOCUMENTS

WO  2013052785 A1  4/2013

OTHER PUBLICATIONS

Harley-Davidson, "Harley-Davidson LiveWire Beckons a New Motorcycling Experience," <https://www.harley-davidson.com/us/en/about-us/hd-news/2019/livewire-beckons-new-moto-experience.html> webpage available as early as Jul. 11, 2019.
(Continued)

*Primary Examiner* — Toan N Pham
(74) *Attorney, Agent, or Firm* — Michael Best & Friedrich LLP

(57) ABSTRACT

A system generates haptic feedback in an electric vehicle. The system comprises a frame, an energy storage device, and a wheel rotatably coupled to the frame. A motor receives power from the energy storage device and provides torque to the wheel. A controller determines a first operational state of the electric vehicle and transmits a first torque signal to the motor to control the motor to transmit first torque levels to the wheel to propel the electric vehicle. The controller determines a second operational state of the electric vehicle and transmits a second torque signal to the motor assembly. The motor assembly transmits second torque levels to the wheel to generate haptic feedback. The second torque signal is based on the second operational state of the electric vehicle and a torque profile stored in the memory, where the torque profile defines an irregular-shaped periodic waveform (e.g., a heartbeat rhythm).

20 Claims, 6 Drawing Sheets

Related U.S. Application Data continuation of application No. 16/829,627, filed on Mar. 25, 2020, now Pat. No. 10,906,557.

(60) Provisional application No. 62/875,408, filed on Jul. 17, 2019.

(58) Field of Classification Search
CPC .............. F16H 61/24; B60L 2200/12; B60L 2240/423; B60L 2250/00; B60L 15/20; B60L 50/60; Y02T 10/64; Y02T 10/70; Y02T 10/72

See application file for complete search history.

(56) References Cited

U.S. PATENT DOCUMENTS

| | | | |
|---|---|---|---|
| 5,771,475 A | 6/1998 | Tabata et al. | |
| 6,595,308 B2 | 7/2003 | Bowen | |
| 6,751,534 B2 | 6/2004 | Robichaux et al. | |
| 7,288,909 B2 | 10/2007 | Yokozutsumi et al. | |
| 7,742,303 B2 | 6/2010 | Azuma et al. | |
| 8,700,240 B2 | 4/2014 | Chiba | |
| 8,712,615 B2 | 4/2014 | Omote et al. | |
| 8,825,250 B2 | 9/2014 | Luke et al. | |
| 8,897,959 B1 | 11/2014 | Sweney et al. | |
| 9,292,983 B2 | 3/2016 | Luke et al. | |
| 9,908,370 B2 | 3/2018 | Sweney et al. | |
| 10,376,731 B2 | 8/2019 | Fuchs | |
| 10,597,073 B2 | 3/2020 | Lee et al. | |
| 10,906,557 B1 * | 2/2021 | Aunkst | B60W 50/16 |
| 11,639,182 B2 * | 5/2023 | Aunkst | B60L 50/60 |
| | | | 340/407.1 |
| 2011/0187521 A1 | 8/2011 | Beruscha et al. | |
| 2015/0199955 A1 | 7/2015 | Draganic | |
| 2018/0065551 A1 | 3/2018 | Sweney et al. | |

OTHER PUBLICATIONS

Jalopnik, "The Electric Harley-Davidson LiveWire is a Shockingly Fun Bid for the Future," <https://jalopnik.com/the-electric-harley-davidson-livewire-is-a-shockingly-f-1836321059> webpage available as early as Jul. 16, 2019.

\* cited by examiner

HAPTIC FUNCTION OF ELECTRIC VEHICLE POWERTRAIN

CROSS-REFERENCE TO RELATED APPLICATIONS

This application claims priority to and claims the benefit of co-pending U.S, patent application Ser. No. 17/155,373 filed on Jan. 22, 2021, issuing as U.S. Pat. No. 11,639,182, which claims priority to and claims the benefit of U.S. patent application Ser. No. 16/829,627 filed on Mar. 25, 2020, issuing as U.S. Pat. No. 10,906,557, which claims priority to and claims the benefit of U.S. Provisional Patent Application No. 62/875,408, filed on Jul. 17, 2019, the entire contents of which is hereby incorporated by reference in its entirety.

TECHNICAL FIELD

The present invention relates to an electric vehicle powertrain. More particularly, this invention relates to haptic feedback provided to a rider of an electric vehicle using a motor as a source of torque for generating the haptic feedback.

BACKGROUND

Electric powertrains do not naturally provide any indication of a vehicle's state when propulsion is enabled in the vehicle but torque has not been applied to the wheels. In other words, electric powertrains and power electronics are very quiet and have no tactile feedback to a rider while the vehicle is at rest but the propulsion system is in an active state, similar to an idling state of an internal combustion engine (ICE) vehicle.

SUMMARY

A haptic function may use existing feedback and actuation channels in electric vehicle powertrain software, an inverter, and electromagnetics of the motor. Motor torque may be modulated and applied at a frequency that vibrates a vehicle without causing a tractive torque (i.e., a vehicle will not move).

In software, a torque signal may be scripted with frequency, phase, magnitude, and duration specified by adjustable and/or calibratable parameters to create a haptic feedback feature. Multiple torque signals can be summed together to allow for ample variations of torque character in an output torque command. The haptic feature may be applied when the vehicle speed is below an adjustable threshold (e.g., zero or near to zero mph).

In some embodiments, a system generates haptic feedback in an electric vehicle. The system comprises a frame, an energy storage device that is supported by the frame, and at least one wheel rotatably coupled to the frame. Also, a motor assembly is supported by frame, where the motor assembly is configured to receive power from the energy storage device and provide torque to the at least one wheel. A controller comprises an electronic processor that is communicatively coupled to the motor assembly and a memory that is coupled to the electronic processor. The memory stores a torque profile defining an irregular-shaped periodic waveform and a program. The program, when executed by the electronic processor, configures the controller to determine a first operational state of the electric vehicle and transmit a first torque signal to the motor assembly to control the motor assembly. The motor assembly is controlled to transmit first torque levels to the at least one wheel to propel the electric vehicle. Levels of the first torque signal are based on the first operational state of the electric vehicle. The controller further determines a second operational state of the electric vehicle and transmits a second torque signal to the motor assembly to control the motor assembly. The motor assembly is controlled to transmit second torque levels to the at least one wheel to generate haptic feedback. Levels of the second torque signal are based on the second operational state of the electric vehicle and the torque profile defining the irregular-shaped periodic waveform stored in the memory.

In some embodiments, a method generates haptic feedback in an electric vehicle. The method comprises storing in a memory a torque profile defining an irregular-shaped periodic wave form and a program executable by an electronic processor. The electronic processor is coupled to a motor assembly supported by a frame of the electric vehicle. The motor assembly is configured to receive power from an energy storage device of the electric vehicle and provide torque to at least one wheel rotatably coupled to the frame. The program, when executed by the electronic processor, configures a controller of the electric vehicle to determine a first operational state of the electric vehicle and transmit a first torque signal to the motor assembly. The motor assembly transmits first torque levels to the at least one wheel to propel the electric vehicle. Levels of the first torque signal are based on the first operational state of the electric vehicle. The controller is further configured to determine a second operational state of the electric vehicle and transmit a second torque signal to the motor assembly to control the motor assembly to transmit second torque levels to the at least one wheel to generate haptic feedback. Levels of the second torque signal are based on the second operational state of the electric vehicle and the torque profile defining the irregular-shaped periodic waveform stored in the memory.

In some embodiments, an electric vehicle comprises a frame, a wheel rotatably coupled to the frame, an energy storage device, and a motor supported by the frame. The motor is configured to convert power from the energy storage device for transmission to the wheel. A controller comprises an electronic processor that is coupled to a memory. The memory stores a program that when executed by the electronic processor configures the controller to control the motor, while coupled to the wheel, to produce a first torque that is capable of propelling the electric vehicle. The controller is further configured to control the motor, while coupled to the wheel, to produce a second torque that generates haptic feedback via the wheel. A temporal pattern of the haptic feedback is an irregular-shaped periodic wave form.

Other features and aspects of the invention will become apparent by consideration of the following detailed description and accompanying drawings.

DETAILED DESCRIPTION

Figure 1:
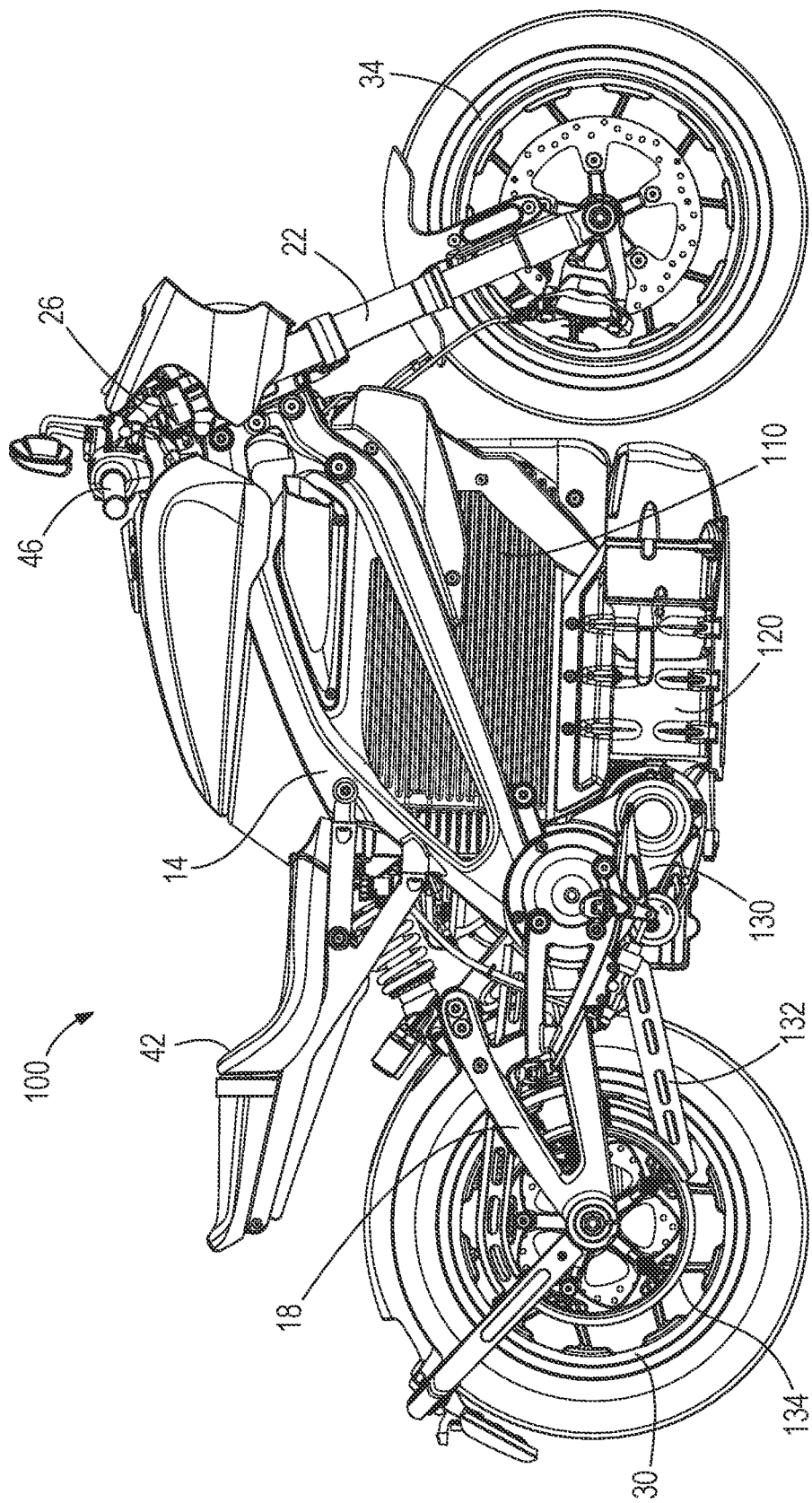
FIG. 1 illustrates an electric vehicle in the form of a motorcycle, in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Haptic feedback is provided in an electric vehicle using torque produced by a motor and a power controller that are also used for vehicle propulsion. In some embodiments, the motor provides the haptic feedback while the electric vehicle is running and stationary, in other words, when the electric vehicle is "at idle." The haptic function can be activated using software logic of a torque controller such that a torque profile may be applied to the motor when the vehicle is idle. The idle state may be detected when the electric vehicle is in the run state, a start switch for the vehicle has been actuated, and vehicle speed and applied torque are below calibratable thresholds. By setting these parameters appropriately in a vehicle, the haptic function is active when the vehicle is running, but not moving or applying enough wheel torque to move the vehicle forward over time. Threshold values for distinguishing between an idle state and a drive state (e.g., applying enough wheel torque to propel the vehicle), may depend on the type of vehicle platform, or individual vehicle characteristics (e.g., the weight of the vehicle). In some embodiments, other thresholds for speed and/or torque may be configured for determining when to apply haptic feedback while the vehicle is in a drive state, or moving (e.g., haptic feedback may be applied from 0-30 miles per hour). Moreover, in some embodiments, speed and/or wheel torque thresholds may not be utilized. For example, the haptic feedback may be applied at any speed or anytime while the vehicle is running (e.g., idle state and drive state).

A haptic feedback torque profile includes a series of discrete torque commands that may be repeated over time, for example, while the vehicle is in the idle state. The haptic feedback torque profile is defined by software executed by an electronic processor of the torque controller. The scripted torque commands configure the torque controller to create a repeating wave shape with a net torque result of zero thereby using the vehicle's traction motor as an actuator that produces a noticeable feeling at the rider interface points (i.e., haptic feedback).

The haptic feedback torque profile is defined according to an array of values, and torque commands are scripted with respect to time based on the torque profile. The time period that the profile is repeated over is calibratable to set a frequency for the delivered profile. In some embodiments, there are multiple selectable haptic feedback torque profiles provided and time period calibrations that allow for multiple unique output wave shapes with different amplitudes and frequencies.

Figure 2:
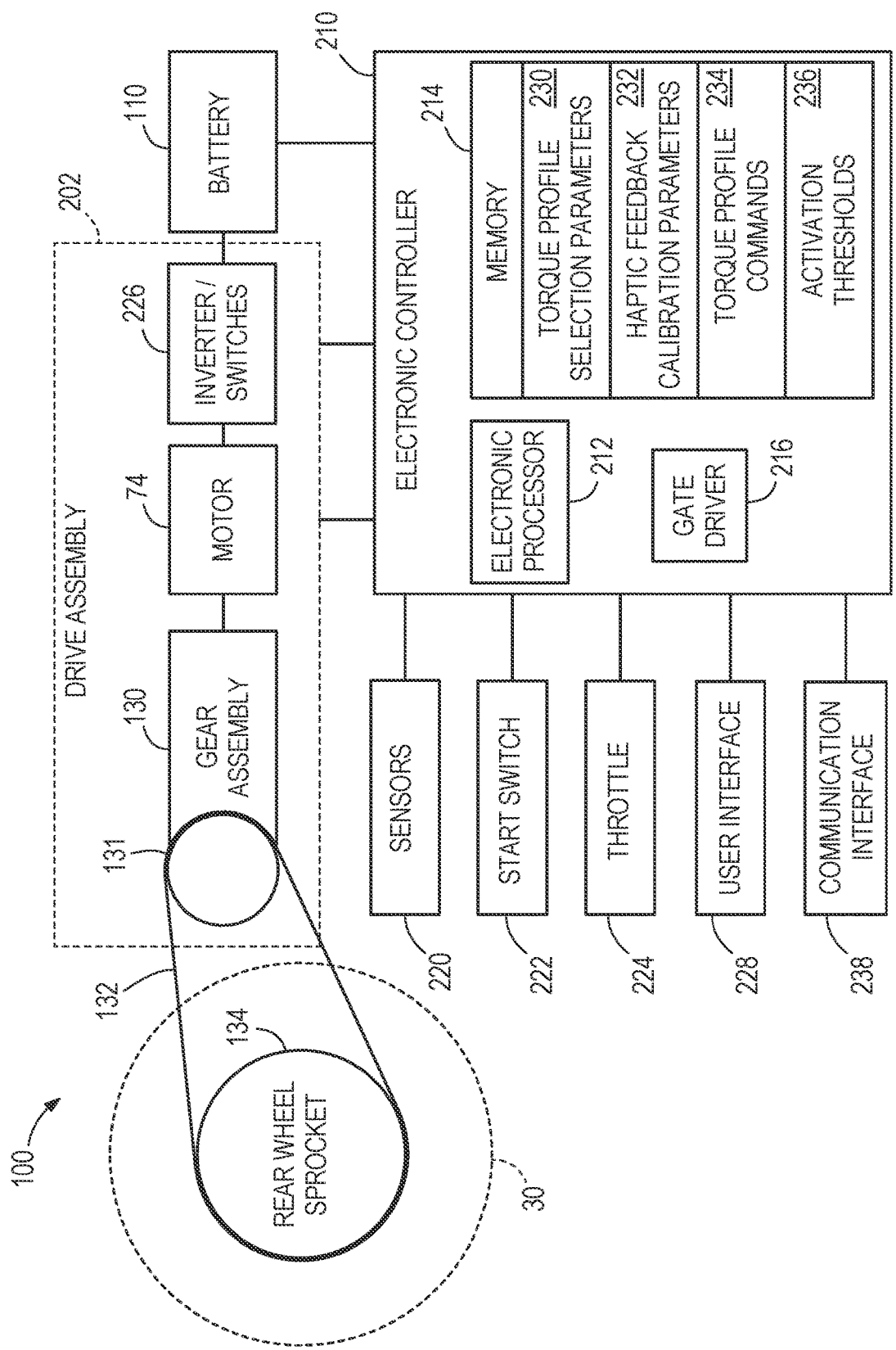
FIG. 2 is a schematic block diagram illustrating the electric vehicle of FIG. 1, in accordance with some embodiments.

FIGS. 1 and 2 illustrate an electric vehicle in the form of a motorcycle system 100. The motorcycle system 100 includes a frame 14, a swing arm 18 that is pivotally coupled to a rear portion of the frame 14, and a front fork 22 that is rotatably coupled to a front portion of the frame 14 at a steering head 26. A rear wheel 30 is coupled to the swing arm 18, and a front wheel 34 is coupled to the front fork 22. The rear wheel 30 and the front wheel 34 support the frame 14 for movement along the ground. A straddle seat 42 overlies at least a portion of the frame 14 for supporting at least one rider. The motorcycle system 100 includes handlebars 46 coupled to the front fork 22 via the steering head 26 for steering the front wheel 34. Various controls and indicators for operating the motorcycle system 100 may be located on the handlebars 46. For example, a start button, a key input, and/or another type of mechanism for activating a start switch 222 in the motorcycle system 100 may be located on or near the handle bars 46. Also, a throttle mechanism 224 for generating a demand signal for torque to the rear wheel 30 may be disposed on the handle bars 46. The motorcycle system 100 may be referred to as a motorcycle 100, a system 100, or an electric vehicle 100. A user interface 228 for controlling or configuring the motorcycle system 100 may be located on the handle bars 46 or in another location of the motorcycle system.

The motorcycle 100 further includes a battery assembly 110, a motor assembly 120, a gear assembly 130, a drive sprocket 131, a drive belt 132 (located under a belt guard), and a rear wheel sprocket 134 of the rear wheel 30. The motor assembly 120 and the gear assembly 130 together may be referred to as a drive assembly 202. The battery assembly 110 may be referred to as an energy storage device. Although illustrated and described as having a belt final drive, the motorcycle 100 in alternate constructions includes a chain final drive or shaft drive to the rear wheel 30. Also, depending on the configuration and sizing of the motor assembly 120 and the performance envelope of the motorcycle 100, the gear assembly 130 may be eliminated. In some constructions, the motor assembly 120 drives the drive belt 132, or other final drive member, directly.

The swing arm 18 is pivotably mounted to the motorcycle 100 about a pivot shaft. The pivotable swing arm 18 allows the rear wheel 30 to swing up and down with respect to the frame 14. The swing arm 18 couples to the rear wheel 30 about a rear wheel axle (not shown), which is fixed with respect to the swing arm 18. The rear wheel sprocket 134 is mounted on and fixed for rotation with the rear wheel axle, such that the rear wheel sprocket 134 is only moveable in a rotational direction. The rear wheel sprocket 134 is positioned within a drive line and rotates with the wheel 30 in response to movement of the belt 132.

The drive sprocket 131 forms the output of the gear assembly 130 and is coupled to the rear wheel 30 via the belt 132 and the rear wheel sprocket 134. The belt 132 engages and wraps partially around each of the drive sprocket 131 and the rear wheel sprocket 134. Upstream of the drive sprocket 131, the gear assembly 130 includes at least a pair of meshed gears configured to change an input rotation speed by a factor less than 1 and increase torque by a factor greater than 1. The drive sprocket 131 engages the belt 132 and transmits torque from the motor assembly 120 to the rear wheel sprocket 134 via the belt 132. Thereby, the motorcycle 100 is propelled forward when the applied torque is great enough to cause traction between the rear wheel 30 and the road and inertia is overcome. The battery assembly 110 is electrically coupled to the motor assembly 120 for powering the motor assembly 120. Although the battery assembly 110, the motor assembly 120, and the gear assembly 130 are described herein in the context of the motorcycle 100, it should be understood that the battery assembly 110, the motor assembly 120, and the gear assembly 130 could be used on other electric vehicles, such as automobiles, all-terrain vehicles, and the like for use in providing the haptic feedback to a rider.

The motor assembly 120 includes a motor 74 that may be an AC induction motor, and an inverter 226 that comprises power electronics (not shown) for supplying electromagnetic current to windings of the motor 74 to generate torque. The motor 74 may be referred to as the traction motor 74. The inverter 226 may convert DC power from the battery assembly 110 to AC power to be supplied to the motor 74 for control of the operation of the motor. The inverter 226 includes one or more circuit boards (not shown) that connect switching electronics (e.g., IGBTs, MOSFETS, or the like) for supplying battery power to the motor 74. In some embodiments, the motor 74 may be a DC motor, such that inverter function circuitry may be omitted in the circuit board. The one or more circuit boards of the inverter 226 may also include other electronic components that control operation of the motor 74 and generate the haptic feedback.

The motorcycle 100 may include one or more sensors 220 for determining an operational state of the motorcycle 100. For example, the sensors may detect when the motorcycle 100 is in an idle state or in a drive state. The drive state may be indicated when the motorcycle 100 is moving and/or when torque is being applied to the gear assembly 130 or the rear wheel 30 for propelling the motorcycle 100 forward. The one or more sensors may be communicatively coupled to a controller 210 and provide sensor information to the controller 210. The one or more sensors 220 may include, for example, a movement sensor such as a wheel speed sensor or an accelerometer configured to sense movement of the motorcycle 100, a motor encoder for sensing rotation of a shaft in the motor 74, a drive shaft rotation sensor, a power converter sensor configured to sense voltage in the inverter 226, a throttle position sensor configured to sense a position of the throttle 224, a motor voltage sensor configured to sense a voltage across the motor 74, a motor current sensor configured to sense a current flow through the motor 74, a motor rotational sensor configured to sense rotation of the motor 74, a wheel rotation sensor configured to sense rotation of the front wheel 30 and/or the rear wheel 34.

The motorcycle 100 also includes the controller 210. The controller 210 may be communicatively coupled to, among other things, the battery 110, the inverter 226, the motor 74, and/or the sensors 220. The controller 210 controls operation of the motor 74 to provide torque for propelling the motorcycle 100 and for providing haptic feedback to a rider. The controller 210 may be referred to as a torque controller or a motor controller, for example. The controller 210 includes one or more integrated circuits, integrated circuit components, analog circuits, and/or analog circuit components. The controller 210 comprises an electronic processor 212, a memory 214, and a gate driver 216. The memory 214 may comprise a non-transitory computer readable or electronic processor readable memory such as a read only memory (ROM) and/or random access memory (RAM). The electronic processor 212 executes a program to control the operation of the drive assembly 202 where power from the battery 110 is provided to windings of the motor 74. The electronic processor 212 may include a microprocessor, a programmed logic controller (PLC), a programmable gate array (PGA) such as a field programmable gate array (FPGS), an application specific integrated circuit (ASIC), and/or another microcontroller device. The memory 214 is capable of storing a program including electronic processor executable instructions and/or data that configures the controller 210 to implement functions of the motorcycle 100, such as delivering torque to the rear wheel sprocket 134. The memory 214 may store one or more torque profiles for generating haptic feedback using the application of torque to the gear assembly 130 by the motor 74. The gate driver 216 is communicatively coupled to the inverter 226 for driving switches (e.g., MOSFETs, IGBTs, not shown) of the inverter 226. The gate driver 216 may transmit drive signals (e.g., pulse width modulation (PWM) gate drive signals) to the inverter 226 for driving the switches that provide the power to the motor 74 from the battery 110. Alternatively or in addition, controller 210 logic may be implemented in an analog circuit.

The motorcycle 100 may include a user interface 228 that allows a user to interact with the motorcycle 100 (e.g., the controller 210) to control various operations or configurations of the motorcycle. In some embodiments, the user interface 228 includes a display screen that may have a touch screen functionality for user input (e.g., with a graphical user interface). The user interface may include physical control mechanisms such as buttons, sliders, or knobs, or switches for user input. Moreover, the user interface 228 may include an infotainment system. The motorcycle 100 may include one or more communication interfaces 238. For example, the communication interface may be configured to receive a cable or wire input to enable communication with the electronic controller 210 and/or the memory 214. In some embodiments, the communication interface includes a wireless transceiver for communication to and/or from the controller 210. For example, a user device (e.g., smart phone, laptop, etc.) may communicate wirelessly with the controller 210 via a wireless network (e.g. cellular, WiFi, Bluetooth, etc.). In some embodiments, the user interface 228 and/or the communication interface 238 may be utilized to configure parameters and/or software in the controller 210 and/or the memory 214 for controlling haptic feedback in the motorcycle 100.

The controller 210 may determine a state of the motorcycle 100, for example, an idle state or a drive state, based on output signals from the one or more sensors 220, the motor 74, the inverter 226, the battery 110, or based on user input via a mechanical and/or electrical input mechanism of the motorcycle 100. For example, when user input activates a start switch 222 of the motorcycle 100, the motorcycle begins running or enters a run state from which the controller 210 may place the motor 74 into an idle state (i.e., standby) where the motor 74 is running but not enough torque is applied to the gear assembly to move the motorcycle forward. A drive state occurs when the motorcycle 100 is powered on and moving, and/or torque is being applied to the rear wheel 30 for propelling the motorcycle 100. When the throttle 224 is engaged the controller 210 provides power to the motor 74 to propel the motorcycle 100. The idle state also occurs when the motorcycle 100 stops being propelled forward (i.e., torque is not being applied for the purpose of propelling the motorcycle 100 forward). The controller 210 may determine the state of the motorcycle 100 based on a sensed throttle 224 position, a sensed electrical characteristic of the battery 110, the inverter 226, or the motor 74, a sensed rate of rotation of the motor 74 and/or the wheel 30, for example. The controller 210 may determine that the motorcycle 100 is in an idle state when the motorcycle 100 is powered on and the torque applied by the motor 74 falls below a specified torque threshold 236 and/or motorcycle speed is below a specified speed threshold 236 that are stored in the memory 214.

When the controller 210 determines that the motorcycle 100 is in the idle state, the gate driver 216 of the controller 210 sends control signals to the inverter 226 circuitry to supply specified energy levels in a specified temporal pattern from the battery 110 to the motor 74. The motor 74 then generates haptic feedback to a rider of the motorcycle 100 while in a connected state with the gear assembly 130, the belt 132, the rear wheel sprocket 134, and the rear wheel 30, without propelling the motorcycle 100 substantially forward (e.g., with substantially zero net torque). The levels of applied torque and the temporal pattern of the applied torque for the haptic feedback may be referred to as a torque profile 234. One or more torque profiles 234 are programmed into the memory 214 and executed by the controller 210. The memory 214 may store multiple torque profiles 234 (e.g., torque profiles may be pre-loaded in the factory or stored to the memory 214 via the user interface 238 and/or the communication interface 238). The torque profiles 234 may be selectable to change the shape, frequency, and/or amplitude of the haptic feedback. The torque profiles may be calibrated or configured by a user for adjusting the frequency or amplitude of an applied haptic feedback signal (e.g., change the period of a repeating signal or select an amplitude multiplier). Torque profile selection parameters 230 and/or haptic feedback calibration parameters 232 may be stored in the memory 214. In some embodiments, the torque profile selection parameters 230 and/or haptic feedback calibration parameters 232 may be configured via the user interface 228 and/or the communication interface 238 by a user of the motorcycle 100, a professional at a point of sale, or a manufacturer. For example, a professional at a dealership may connect a cable between a laptop and a bus of the motorcycle 100 to communicate with the controller 210 and/or memory 214, and use a digital tech service tool on the laptop to select a pre-loaded torque profile stored in the memory 214, turn haptic feedback on or off, add a torque profile, or update haptic feedback parameters stored in the memory 214. In another example, a user interface 228 of an infotainment system on the motorcycle 100 or a user interface displayed by a mobile application on a smart phone may provide a graphical user interface that receives user input to select a torque profile, add a torque profile, turn haptic feedback on or off, or select haptic feedback parameters. Different haptic feedback characteristics may selected based on motorcycle platform or user preference, for example.

A torque profile 234 may include a series of discrete torque commands that may be repeated over time (e.g., while the motorcycle 100 is in the idle state). The torque profile 234 is defined by software and/or parameters executable by the electronic processor 212 of the controller 210. The scripted torque commands 234 configure the controller 210 to transmit signals of a repeating wave shape to the motor assembly 120, or to the inverter 226, with a net torque result of substantially zero. Thereby, the motorcycle's motor 74 is used as an actuator that produces a noticeable feeling at the rider interface points (i.e., haptic feedback). As noted above, characteristics of the repeating wave shape (i.e., torque profile) are programmable and the frequency or period of the wave shape (calibration parameters) is configurable based on user input.

The torque profile commands 234 are defined according to an array of values where the torque profile commands are scripted with respect to time. A time period for executing commands of a torque profile array is calibratable to establish a desired frequency for repeatedly delivering the profile and thus the haptic feedback to the rider. In some embodiments, there are parameters 230 for selecting from multiple torque profiles 234 and haptic feedback calibration parameters 232 that allow for multiple torque profile period calibrations and multiple selectable unique output wave shapes. In one example, there are two selectable profiles 234 and two period calibrations 232 allowing for two unique output wave shapes and a selected frequency from the two frequencies for each of the output wave shapes. However, the disclosure is not limited in this regard, and any suitable number of haptic feedback torque profiles 234 and/or haptic feedback calibration parameters 232 may be stored in the memory 214.

TABLE 1

Torque Profile-a 25 point torque profile array

| Sample | Torque |
| --- | --- |
| 1 | 0 |
| 2 | 0.25 |
| 3 | 0.48 |
| 4 | 0.58 |
| 5 | 0.84 |
| 6 | 0.95 |
| 7 | 1 |
| 8 | 0.98 |
| 9 | 0.91 |
| 10 | 0.77 |
| 11 | 0.59 |
| 12 | 0.37 |
| 13 | 0.13 |
| 14 | 0.12 |
| 15 | −0.37 |
| 16 | −0.59 |
| 17 | −0.77 |
| 18 | −0.9 |
| 19 | −0.98 |
| 20 | −1 |
| 21 | −0.95 |
| 22 | −0.85 |
| 23 | −0.69 |
| 24 | −0.48 |
| 25 | −0.25 |

Figure 3:
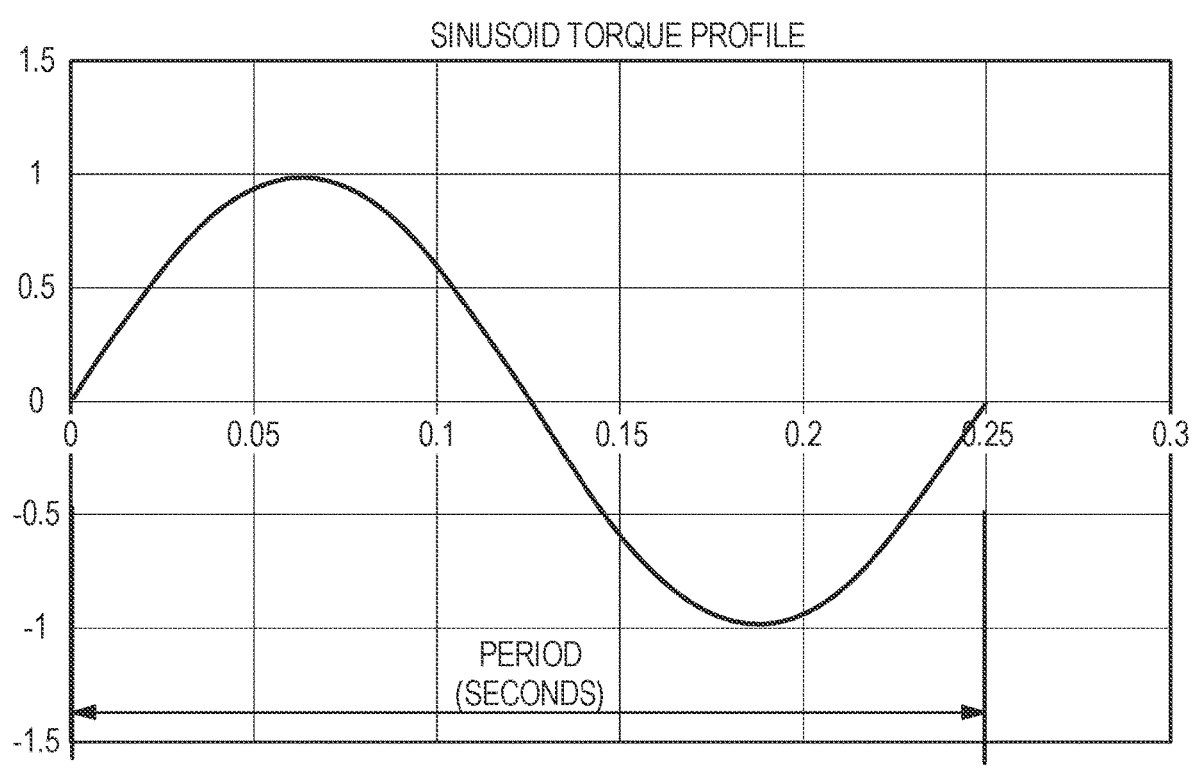
FIG. 3 illustrates a sinusoid signal based on a torque profile described in Table 1, in accordance with some embodiments.

Table 1 illustrates an example torque profile with a 25 point array of values for defining a set of torque commands 234. The torque profile array values may be utilized by the controller 210 to issue commands to the motor assembly 120 to control torque applied to the wheel 30. The set of torque profile commands 234 may be executed over a calibrated period of time and may be repeated over multiple periods. The duration of application of each torque level in the torque profile array, may be determined by dividing the calibrated period of the torque profile commands by the number of points in the torque array. For example, setting a period of 250 ms for executing commands corresponding to the 25 point torque profile of Table 1, yields a time step between torque points of 10 ms, where 250 ms/25 s samples=10 ms/sample. The time step between torque points of a torque profile may be adjusted according to stored configuration parameters 232 that correspond to the torque profile period divided by the total count of points in the torque profile array. In the above example, each torque setting is held for 10 ms according to a command 234 of the torque controller 210 to the motor assembly 120. The overall torque array of Table 1 is repeated every profile period of 250 ms based on the state of the motorcycle 100 (e.g., while the motorcycle 100 is in the idle state). FIG. 3 illustrates a sinusoid with a period of 0.25 s (250 ms), which can be repeated at a frequency of 4 Hz according to the torque profile of Table 1. The torque values in this and other examples given herein may represent motor torque in Newton-meters (N-m).

Figure 4:
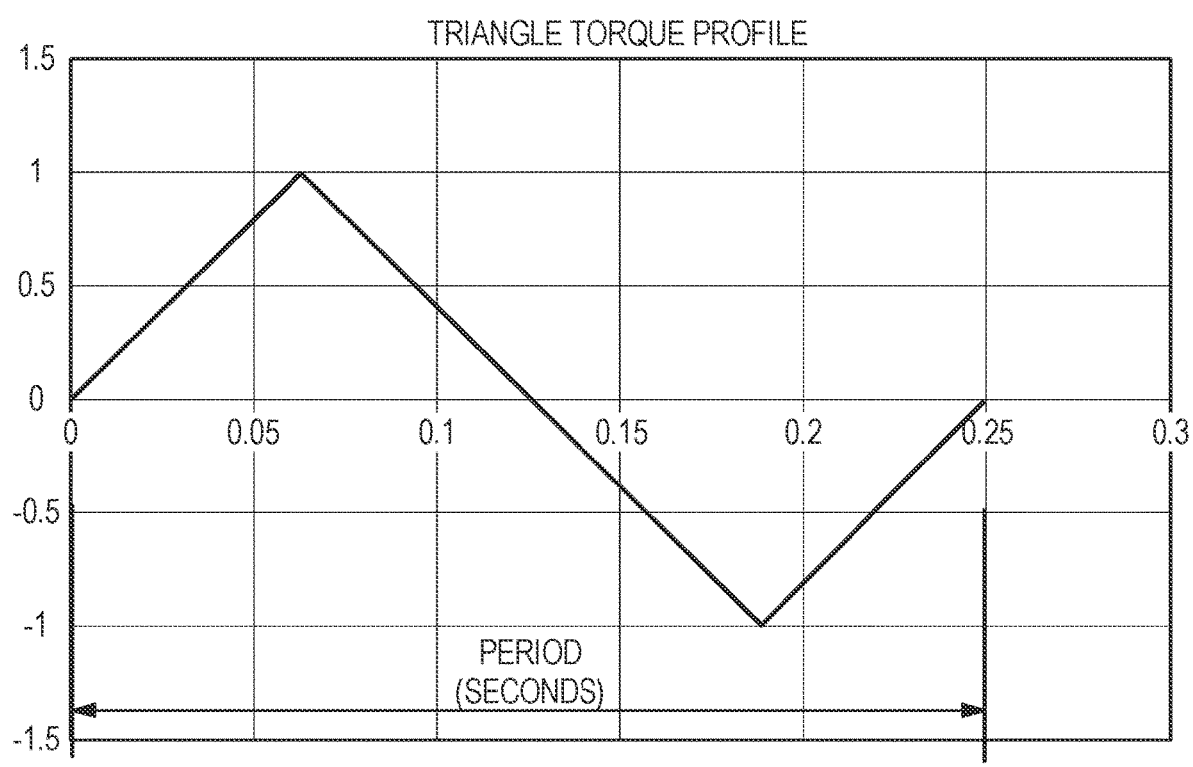
FIG. 4 illustrates a triangle signal based on a torque profile using the same frequency as the signal of FIG. 3, in accordance with some embodiments.

Different and unique torque profiles 234 can be stored in the memory 214. FIG. 4 is an example of a 25 point torque array defining a triangle wave and configured with the same haptic feedback calibration parameters 232 as for the sinusoid shown in FIG. 3 having a torque profile repetition frequency of 4 Hz and a period of 0.25 s.

TABLE 2

Heartbeat Torque Profile A

| Step | Value |
|---|---|
| 0 | 0 |
| 1 | 1 |
| 2 | 2 |
| 3 | −2 |
| 4 | 2 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | 0 |
| 17 | 0 |
| 18 | 0 |
| 19 | 0 |
| 20 | 0 |

TABLE 3

Heartbeat Torque Profile B

| Step | Value |
|---|---|
| 0 | 0 |
| 1 | 0 |
| 2 | 0 |
| 3 | 0.3 |
| 4 | 0.6 |
| 5 | 0.90 |
| 6 | 1.3 |
| 7 | 1.3 |
| 8 | 0.9 |
| 9 | 0.6 |
| 10 | 0.3 |
| 11 | 0 |
| 12 | 0 |
| 13 | −1 |
| 14 | −1 |
| 15 | −1 |
| 16 | −1 |
| 17 | −1 |
| 18 | −1 |
| 19 | 0 |
| 20 | 0 |
| 21 | 0.3 |
| 22 | 0.8 |
| 23 | 1.1 |
| 24 | 1.6 |
| 25 | 1.6 |
| 26 | 0.9 |
| 27 | 0.6 |
| 28 | 0.3 |
| 29 | 0 |

TABLE 3-continued

Heartbeat Torque Profile B

| Step | Value |
|---|---|
| 30 | 0 |
| 31 | 0 |
| 32 | 0 |
| 33 | 0 |
| 34 | 0 |
| 35 | 0 |
| 36 | 0 |
| 37 | 0 |
| 38 | 0 |
| 39 | 0 |
| 40 | 0 |
| 41 | 0 |
| 42 | 0 |
| 43 | 0 |
| 44 | 0 |
| 45 | 0 |
| 46 | 0 |
| 47 | 0 |
| 48 | 0 |
| 49 | 0 |
| 50 | 0 |
| 51 | 0 |
| 52 | 0 |
| 53 | 0 |
| 54 | 0 |
| 55 | 0 |
| 56 | 0 |
| 57 | 0 |
| 58 | 0 |
| 59 | 0 |
| 60 | 0 |
| 61 | 0 |
| 62 | 0 |
| 63 | 0 |
| 64 | 0 |
| 65 | 0 |
| 66 | 0 |
| 67 | 0 |
| 68 | 0 |
| 69 | 0 |
| 70 | 0 |
| 71 | 0 |
| 72 | 0 |
| 73 | 0 |
| 74 | 0 |
| 75 | 0 |
| 76 | 0 |
| 77 | 0 |
| 78 | 0 |
| 79 | 0 |
| 80 | 0 |
| 81 | 0 |
| 82 | 0 |
| 83 | 0 |
| 84 | 0 |
| 85 | 0 |
| 86 | 0 |
| 87 | 0 |
| 88 | 0 |
| 89 | 0 |
| 90 | 0 |
| 91 | 0 |
| 92 | 0 |
| 93 | 0 |
| 94 | 0 |
| 95 | 0 |
| 96 | 0 |
| 97 | 0 |
| 98 | 0 |
| 99 | 0 |
| 100 | 0 |

Figure 5:
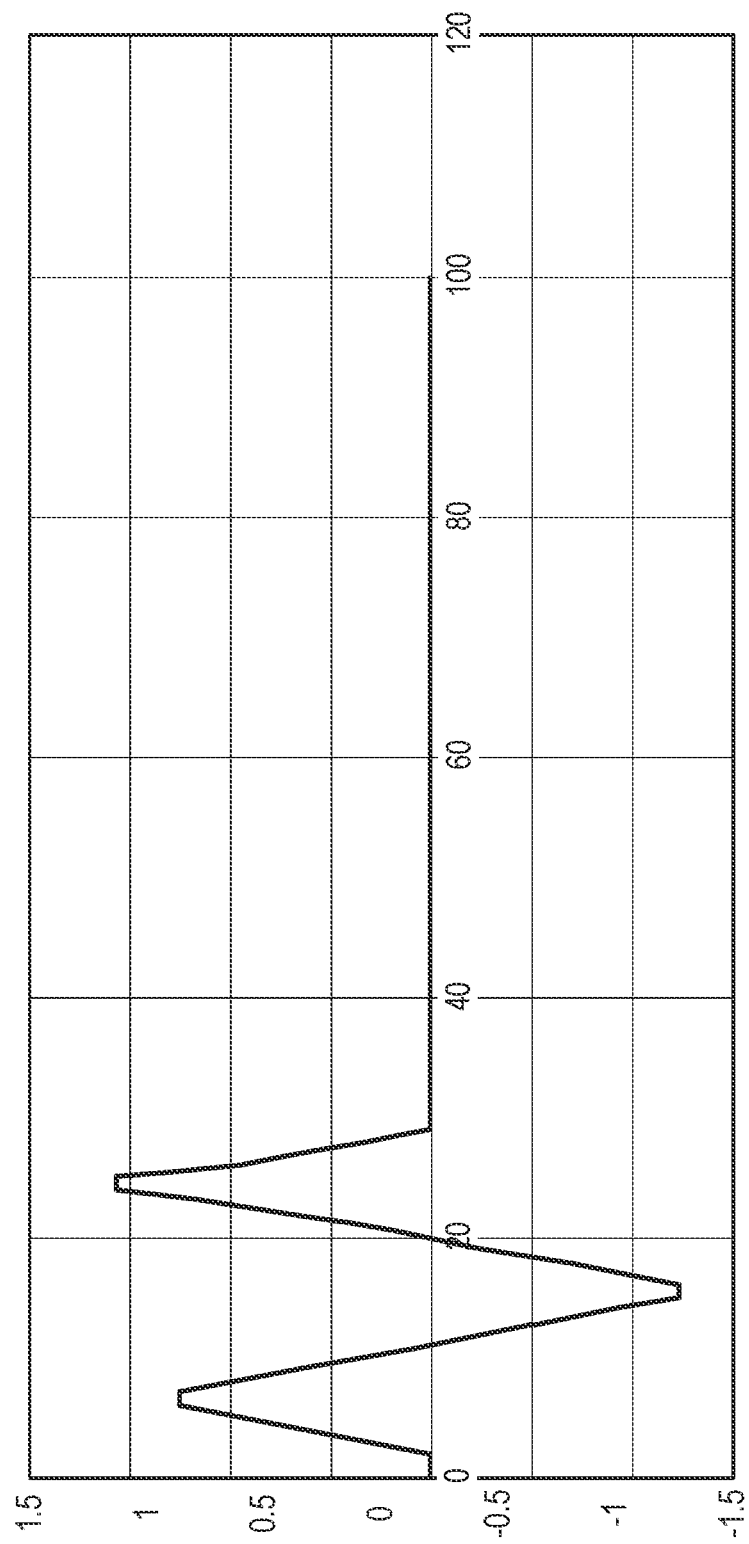
FIG. 5 illustrates an example of a torque signal with a heartbeat rhythm, which is based on a selectable torque profile for generating haptic feedback in an electric vehicle, in accordance with some embodiments.

Tables 2 and 3 represent two torque profiles, A and B, for defining two sets of torque profile commands 234 for generating heartbeat-mimicking haptic feedback to a user via the drive assembly 202 and the rear wheel 30 of FIGS. 1 and 2. In other words, the haptic feedback is generated and perceived to mimic the electrical impulse or resulting sound wave of a human heart during a normal cardiac cycle. Each of the heartbeat torque profiles A and B can be used to configure the controller 210 to drive a unique vehicle haptic feedback experience that may be perceived by a rider as having a heartbeat rhythm. In this regard, the controller may transmit PWM signals based on the torque profile. For example, the gate driver 216 may transmit PWM gate drive signals to the inverter 226 for driving the switches that provide current to the motor 74 from the battery 110. The current provided to the motor 74 may directly determine the torque output by the motor 74. The heartbeat torque profiles A and B of Tables 2 and 3 each have a different number of steps and represent different torque intensity levels. Torque profile A of Table 1 includes 20 torque intensity steps per period. Torque profile B of Table 2 includes 101 torque intensity steps per period. In general, heartbeat torque profile rhythms or heartbeat haptic feedback are characterized by an irregular-shaped periodic wave form that is repeated. The heartbeat torque profile rhythms may have one or more higher-intensity pulses within a first time duration of a torque profile period and quiet time-duration of a lower or zero level torque intensity within the same period of the torque profile. The quiet time-duration may be referred to as a dead zone of the torque profile period and may have a longer duration than the active portion of the period. This torque profile period for haptic feedback can be repeated during an idle state of the motorcycle 100 to mimic a heartbeat signal. Also, the higher-intensity pulses within the torque profile period are not strong enough to propel the motorcycle 100 forward or change the speed of the motorcycle and instead provide haptic feedback to a rider. Each of the torque profiles A and B of Tables 1 and 2 define one torque profile period that includes two same-sign (e.g., positive) torque intensity pulses during a first time duration followed by zero intensity over a second time duration, which may be longer than the first time duration. The zero intensity time period defines a lull in the haptic feedback, and in other constructions a similar lull may be produced even when the torque intensity is not strictly zero if the torque is insufficient to be perceptible by the rider or is perceptible as only as background vibration. The signal may include a different-sign (e.g., negative) torque intensity pulse, for example, as between the two positive pulses in each of the torque profiles A and B. The two same-sign pulses can be the same intensity or different intensities. The sign of the torque pulses correlate to motor shaft direction, particularly clockwise vs. counter-clockwise. FIG. 5 illustrates an example of one period of a heartbeat rhythm torque signal for generating haptic feedback in the motorcycle 100. The signal of FIG. 5 is based on a heartbeat torque profile similar to the torque profile B of Table 3. The period of the heartbeat haptic feedback signal in FIG. 5 shows torque intensity over a range of 101 time units corresponding to one period of the torque profile. The signal shown in FIG. 5 may be adjusted as to period length and may be repeated based on the state of the motorcycle 100. Other signal shapes that mimic the irregular rhythm of a heartbeat may be utilized.

In some embodiments, the haptic feedback may be activated while the motorcycle 100 is in a drive state based on a selected torque profile. For example, a haptic feedback torque profile may be overlaid onto a torque profile that is generated based on throttle position (i.e., used for propelling the motorcycle) to provide haptic feedback while the motorcycle is being driven. In some embodiments, the controller 210 may be configured to apply a first haptic feedback torque profile 234 when the motorcycle 100 is in an idle state and a different haptic feedback torque profile when the motorcycle is in a drive state. In addition or in the alternative, the controller 210 may be configured to utilize a first calibration parameter 232 for controlling the period length of a selected torque profile when the motorcycle 100 is in an idle state and a second or varied calibration parameter 232 during a drive state. Moreover, the controller 232 may be configured to adjust or change one or both of the selected torque profile 234 (i.e., change wave shape) and the haptic feedback calibration parameters 232 (i.e., adjust a torque profile period length) depending on a level of torque being applied to the drive assembly 202 for the propulsion of the motorcycle during a drive state. For example, the controller 210 may generate a change in a haptic feedback torque control signal to the drive assembly 202 when the level of applied torque exceeds or falls below a torque threshold during a drive state.

Torque signals may be summed together to create a single input to a torque control program. For example, the torque profile may be summed with a torque request from the rider such that the haptic profile is a repeating irregular wave superimposed on the torque request from the rider. In some cases, the haptic profile may be included in the summation only when the rider torque request is below a calibratable threshold representing "vehicle idle."

The haptic torque profile is calibratable by assigning discrete torque steps in the sequential array. The calibrator selects the array inputs and enters them to a calibration file which may be written to the software memory at the time of manufacturing or software update.

As noted above, the memory 214 stores torque profile selection parameters 230 for selecting torque profile commands from multiple sets of selectable torque profiles commands 234. Also, the memory 214 stores haptic feedback calibration parameters 232 for configuring a period or frequency of the selected torque profile. Thus, multiple selectable unique output wave shapes and selectable torque profile periods or frequencies are available. In one example embodiment, two selectable profiles 234 are stored in the memory 214 and period calibrations 232 allow for two unique output wave shapes. In some embodiments, adjustable settings for selecting and calibrating torque profile commands for haptic feedback may be configured by a user, a manufacturer, or at a point of sale. For example, the manufacturer adjustable settings may include:
1) Settings that are configurable using a 2 bit diagnostic setting with the options of:
   a. Disable global haptic feedback function
   b. Enable profile A
   c. Enable profile B
2) Configurable torque profile array that is set by calibration of the definition of the torque profile A or the torque profile B.
3) Configurable frequencies that are set for the establishing a profile period A or a profile period B.
4) Haptic function active and inactive during run time is set by calibration of a motor torque threshold. Function active occurs below the motor torque threshold where the motor torque is torque that produces vehicle motion.
5) Haptic function active and inactive during run time is calibratable for a delivered motor-speed threshold. Function is active below the motor-speed threshold.

Figure 6:
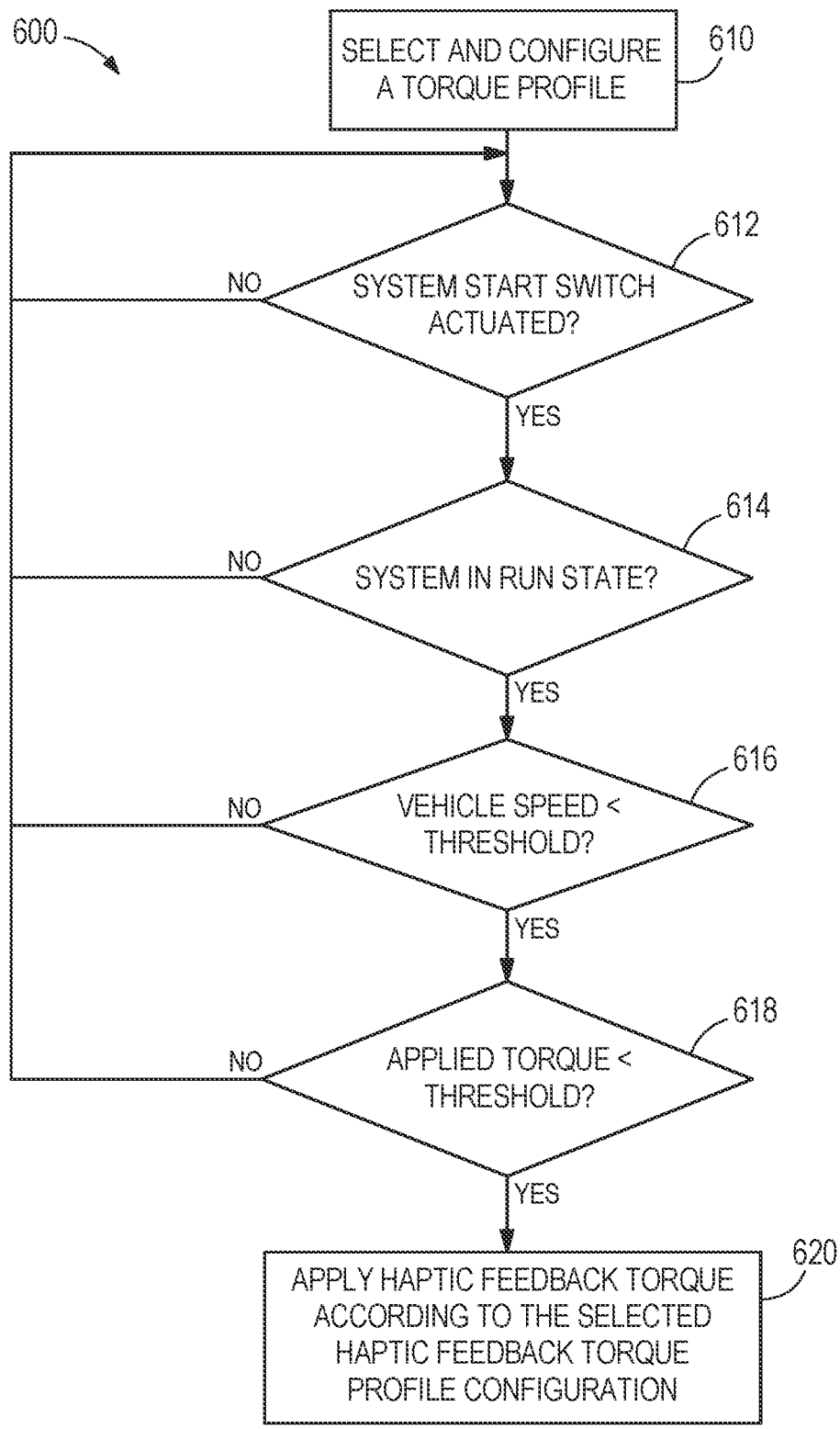
FIG. 6 illustrates a flow chart for a method of activating a haptic feedback function in an electric vehicle, in accordance with some embodiments.

FIG. 6 illustrates a flow chart for a method of activating a haptic feedback function in the motorcycle 100. In step 610, the controller 210 is configured according to a haptic feedback torque profile 234. One or more haptic feedback torque profiles may be preloaded in the vehicle. The haptic feedback torque profile and/or haptic feedback calibration parameters 232 for torque profile period or frequency may be selected via a user interface. Also, one or more thresholds 236 such as a wheel torque threshold 236 and/or a motor speed threshold 236 may be configured via a user interface for determining when to activate and/or deactivate the haptic feedback function (e.g., activate haptic feedback during an idle state and/or a drive state, or cut-off haptic feedback at a specified speed).

In step 612, the controller 210 may read a sensor or receive a signal indicating that a start switch 222 has been activated. In instances when the start switch 222 has been activated, the method may proceed to step 614. In instances when the start switch 222 has not been activated, the method returns to step 612.

In step 614, the controller 210 may read a sensor 220 or receive a signal from the battery 110, the inverter 226, and/or the motor 74, indicating that the motorcycle 100 is in a run state and ready to receive torque commands from the controller 210. In instances when the system 100 is in a run state, the method may proceed to step 616. In instances when the system 100 is not in a run state, the method may proceed to step 612.

In step 616, the controller 210 may read a sensor 220 or receive a signal from the battery 110, the inverter 226, and/or the motor 74 indicating that a speed is below a first specified threshold of the thresholds 236. In instances when the speed is below the first specified threshold 236, the method may proceed to step 618. In instances when the speed is not below the first specified threshold 236, the method may proceed to step 612. In some embodiments, the first specified threshold for speed may be calibrated to a level of speed that indicates the vehicle is in an idle state (e.g., substantially zero or near zero, for example, less than 2 miles per hour) such that the haptic feedback is applied only when the vehicle is in an idle state. In some embodiments, the first specified threshold for speed may be set to a level (e.g., 30 miles per hour) to indicate that the haptic feedback should be applied during the idle state and any time the vehicle is driven under 30 miles per hour. In some embodiments, the first specified threshold for speed may be unlimited or disabled such that the vehicle speed is always below the threshold such that haptic feedback may be applied at any speed.

In step 618, the controller 210 may read a sensor 220, the throttle 224, or receive a signal from the motor 110, the inverter 226, and/or the motor 74 indicating that an applied torque is below a second specified threshold of the thresholds 236. In instances when the applied torque is below the second specified threshold 236, the method may proceed to step 620. In instances when the applied torque is not below the first specified threshold 236, the method may proceed to step 612. In some embodiments, the second specified threshold for wheel torque may be calibrated to a level that indicates the vehicle is in an idle state (e.g., substantially zero torque or near zero torque) such that the haptic feedback is applied only when the vehicle is in an idle state. In some embodiments, the second specified threshold for torque may be set to a level (e.g., 7 Nm) to indicate that the haptic feedback should be applied during the idle state and any time the vehicle is driven with less than 7 Nm of torque. In some embodiments, the second specified threshold for torque may be unlimited or disabled such that the wheel torque is always below the threshold such that haptic feedback may be applied at any level of wheel torque.

In step 620, the controller 210 may be configured to activate the haptic feedback function and transmit haptic feedback torque control signals to the inverter 222 from the gate driver 216 according to the selected haptic feedback torque profile 234. The selected haptic feedback calibration parameters 232 may be utilized for applying a torque profile period or frequency in the haptic feedback.

In some embodiments, based on the haptic feedback, a rider of the electric motorcycle 100 may perceive that the motorcycle is running in an idle state. In other embodiments, the haptic feedback may be applied while the motorcycle is being driven. The rhythm of the haptic feedback activated in step 620 may mimic a heartbeat signal based on the selected torque profile 234.

Although the invention has been described in detail with reference to certain preferred embodiments, variations and modifications exist within the scope and spirit of one or more independent aspects of the invention as described.

What is claimed is:

1. A system for generating haptic feedback in an electric vehicle, the system comprising:
   an electric motor assembly; and
   a controller communicatively coupled to the electric motor assembly and having a memory storing a torque profile,
   wherein the controller is programmed to transmit a torque signal to the electric motor assembly to control the electric motor assembly to generate haptic feedback according to the torque profile stored in the memory,
   wherein the torque profile is configured to generate a repeating heartbeat rhythm of haptic feedback.

2. The system of claim 1, further comprising one or more sensors communicatively coupled to the controller, wherein the one or more sensors detect whether the electric vehicle is in a drive state or an idle state, and wherein the controller is programmed to control the electric motor assembly to generate the repeating heartbeat rhythm of haptic feedback exclusively in the idle state.

3. The system of claim 2, wherein the idle state of the electric vehicle is based on one or both of a travel speed of the electric vehicle and a torque applied to a drive wheel of the electric vehicle.

4. The system of claim 1, wherein the controller is programmed to transmit the torque signal to generate the haptic feedback concurrently with a drive torque signal to the electric motor assembly, the drive torque signal corresponding to a throttle input for driving the electric vehicle in at least one operational state of the electric vehicle.

5. The system of claim 1, wherein the memory stores an additional torque profile and the controller is programmed to enable switching between the torque profile that generates the repeating heartbeat rhythm of haptic feedback and the additional torque profile, which controls the electric motor assembly to generate haptic feedback of an alternate heartbeat rhythm or a different periodic waveform.

6. The system of claim 1, wherein the torque profile configured to generate the repeating heartbeat rhythm of haptic feedback is an irregular-shaped periodic wave form including an active portion with multiple pulses and a lull portion.

7. The system of claim 6, wherein a time duration for the lull portion exceeds a time duration of the active portion.

8. The system of claim 1, wherein the electric motor assembly is coupled to a drive wheel of the electric vehicle and configured to selectively drive rotation of the drive wheel for forward movement of the electric vehicle.

9. The system of claim 1, wherein the controller is programmed to adjust at least one characteristic of the repeating heartbeat rhythm of haptic feedback, according to a parameter stored in the memory.

10. The system of claim 9, wherein the at least one characteristic of the repeating heartbeat rhythm of haptic feedback is selected from the group consisting of: frequency and amplitude.

11. A method for generating haptic feedback in an electric vehicle, the method comprising:
   storing a torque profile in a memory of a controller coupled to an electric motor assembly of the electric vehicle; and
   executing a program within the controller, the program causing the electric motor assembly to generate haptic feedback according to the torque profile stored in the memory,
   wherein the torque profile generates a heartbeat rhythm of haptic feedback from the electric motor assembly to the vehicle operator.

12. The method of claim 11, further comprising detecting based on one or more inputs from one or more sensors communicatively coupled to the controller whether the electric vehicle is in a drive state or an idle state, wherein the program configures the controller to transmit the haptic torque signal to the electric motor assembly exclusively in the idle state.

13. The method of claim 12, wherein the idle state of the electric vehicle is based on one or both of a travel speed of the electric vehicle and a torque applied to a drive wheel of the electric vehicle.

14. The method of claim 11, wherein the program is executed to cause the controller to transmit the heartbeat rhythm of haptic feedback to the electric motor assembly concurrently with a drive torque signal in at least one operational state of the electric vehicle.

15. The method of claim 11, further comprising receiving a user selection at a user interface to select the torque profile from a plurality of unique selectable torque profiles stored in the memory for generating haptic feedback.

16. The method of claim 11, wherein the torque profile that generates the repeating heartbeat rhythm of haptic feedback is an irregular-shaped periodic wave form including an active portion with multiple pulses and a lull portion.

17. The method of claim 16, wherein a time duration for the lull portion exceeds a time duration of the active portion.

18. The electric vehicle of claim 17, wherein the at least one characteristic of the heartbeat rhythm is selected from the group consisting of: frequency and amplitude.

19. The method of claim 11, further comprising the controller modifying the torque profile to adjust a frequency and/or amplitude of the heartbeat rhythm of haptic feedback.

20. An electric vehicle, the electric vehicle, comprising:
   a frame;
   a wheel rotatably coupled to the frame;
   an energy storage device;
   a motor supported by the frame and configured to convert power from the energy storage device for transmission to the wheel; and
   a controller comprising an electronic processor coupled to a memory, the memory storing a program that when executed by the electronic processor configures the controller to:
      control the motor to produce first torque, the first torque configured to propel the electric vehicle,
      control the motor to produce second torque, the second torque generating haptic feedback in a heartbeat rhythm, and
      adjust at least one characteristic of the heartbeat rhythm according to a parameter stored in the memory.

* * * * *